United States Patent
Palombini et al.

(10) Patent No.: US 11,420,534 B1
(45) Date of Patent: Aug. 23, 2022

(54) SYSTEM AND METHODS FOR PRECONDITIONING A POWER SOURCE OF AN ELECTRIC AIRCRAFT

(71) Applicant: BETA AIR, LLC, South Burlington, VT (US)

(72) Inventors: John Charles Palombini, South Burlington, VT (US); Sean Donovan, Richmond, VT (US); Sam Wagner, South Burlington, VT (US); Sarah Overfield, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/515,441

(22) Filed: Oct. 30, 2021

(51) Int. Cl.
| | |
|---|---|
| *B60L 58/18* | (2019.01) |
| *B64D 45/00* | (2006.01) |
| *G06N 20/00* | (2019.01) |
| *B64D 27/24* | (2006.01) |
| *B64C 29/00* | (2006.01) |

(52) U.S. Cl.
CPC .......... *B60L 58/18* (2019.02); *B64C 29/0016* (2013.01); *B64D 27/24* (2013.01); *B64D 45/00* (2013.01); *G06N 20/00* (2019.01); *B60L 2200/10* (2013.01); *B64D 2045/0085* (2013.01); *B64D 2221/00* (2013.01)

(58) Field of Classification Search
CPC .. B60L 58/18; B60L 2200/10; B64C 29/0016; B64D 27/24; B64D 45/00; B64D 2045/0085; B64D 2221/00; G06N 20/00
USPC .......................................................... 701/22
See application file for complete search history.

(56) References Cited

U.S. PATENT DOCUMENTS

| | | | |
|---|---|---|---|
| 9,796,283 B2 | 10/2017 | Fink et al. | |
| 9,834,114 B2 | 12/2017 | Hettrich et al. | |
| 9,954,260 B2 | 4/2018 | Ho | |
| 10,302,703 B2 | 5/2019 | Fleischer et al. | |
| 10,800,287 B2 * | 10/2020 | Vallender | B60L 58/27 |
| 11,014,684 B2 | 5/2021 | Chang et al. | |

(Continued)

FOREIGN PATENT DOCUMENTS

| | | | |
|---|---|---|---|
| CN | 111186585 | * | 5/2020 |
| CN | 111186585 | * | 5/2021 |

(Continued)

OTHER PUBLICATIONS

Tran et al., Thorough state-of-the-art analysis of electric and hybrid vehicle powertrains: Topologies and integrated energy management strategies, Nov. 25, 2019.

(Continued)

*Primary Examiner* — Muhammad Shafi
(74) *Attorney, Agent, or Firm* — Caldwell Intellectual Property Law

(57) ABSTRACT

The present invention is a system and methods for preconditioning a power source of an electric aircraft. The system may include a sensor attached to a power source of an electric aircraft, where the sensor is configured to detect a condition datum of an operating component of the power source, and a flight controller communicatively connected to the sensor, the flight controller configured to determine if there is a divergent element of an operating state of the power source and, if so, initiate a power source modification to correct the divergent element.

18 Claims, 7 Drawing Sheets

(56) References Cited

U.S. PATENT DOCUMENTS

| | | | |
|---|---|---|---|
| 2018/0237138 A1* | 8/2018 | Phan | G08G 5/0039 |
| 2018/0273170 A1 | 9/2018 | D'Sa et al. | |
| 2018/0307231 A1 | 10/2018 | Sorton et al. | |
| 2019/0187212 A1* | 6/2019 | Garcia | G01R 31/382 |
| 2020/0274371 A1* | 8/2020 | Kirleis | B60L 53/00 |
| 2021/0053689 A1 | 2/2021 | Lynn et al. | |

FOREIGN PATENT DOCUMENTS

| | | | | |
|---|---|---|---|---|
| JP | 6873017 | * | 5/2021 | |
| WO | 2015081636 A1 | | 6/2015 | |
| WO | WO-2021166839 A1 | * | 8/2021 | G05D 17/02 |

OTHER PUBLICATIONS

Wu et al., Battery digital twins: Perspectives on the fusion of models, data and artificial intelligence for smart battery management systems, Jul. 9, 2020.

\* cited by examiner

SYSTEM AND METHODS FOR PRECONDITIONING A POWER SOURCE OF AN ELECTRIC AIRCRAFT

FIELD OF THE INVENTION

The present invention generally relates to the field of electric aircrafts. In particular, the present invention is directed to a system and methods for preconditioning a power source of an electric aircraft.

BACKGROUND

Preflight preparations and maintenance of an aircraft is important. Failure to conduct appropriate preflight preparations can result in critical failure of the aircraft during operation.

SUMMARY OF THE DISCLOSURE

In an aspect, a system for preconditioning a power source in an electric aircraft, the system including: a sensor attached to a power source of an electric aircraft, wherein the sensor is configured to detect a condition datum of an operating component of the power source; and a computing device communicatively connected to the sensor, the flight controller configured to: obtain an optimal performance condition of the power source; identify an operating condition of the operating component of the power source as a function of the condition datum; determine a divergent element as a function of the optimal performance condition and the operating condition of the power source; and initiate a power source modification as a function of the divergent element.

In another aspect, a method for preconditioning a power source in an electric aircraft, the method including: detecting, by a sensor attached to a power source of an electric aircraft, a condition datum of the power source; obtaining, by a computing device communicatively connected to the sensor, an optimal performance condition of the power source; identifying an operating condition of the power source as a function of the condition datum; determining a divergent element as a function of the optimal performance condition and the operating condition of the power source; and initiating a power source modification as a function of the divergent element.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
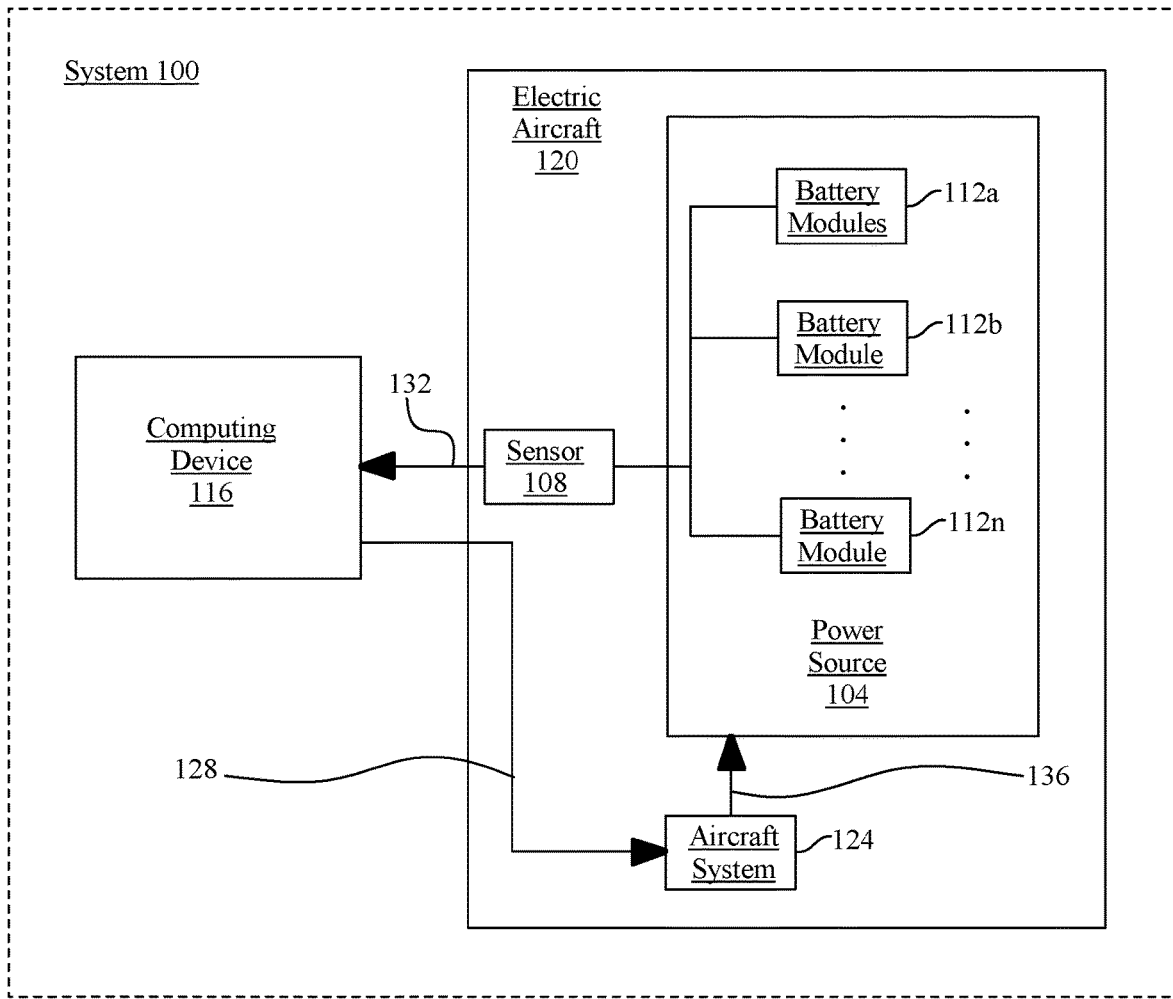
FIG. 1 is a block diagram of an exemplary embodiment of a system for preconditioning a power source of an electric aircraft in accordance with aspects of the invention thereof.

At a high level, aspects of the present disclosure are directed to systems and methods for preconditioning a power source of an electric aircraft. More specifically, the present disclosure can be used to prepare an aircraft for flight. Often aircraft subsystems are manually prepared by flight crews. Manual preflight preparations may limit the speed and accuracy at which aircraft subsystems may be checked prior to flight. Thus, the present disclosure provides a system and methods for rapidly and reliably determining preflight readiness of subsystems, such as a battery module used for storing electrical power, of an electric aircraft.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to orientations as illustrated for exemplary purposes in FIG. 5. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Referring now to FIG. 1, a block diagram illustrating an exemplary embodiment of a preconditioning system 100 is shown in accordance with one or more embodiments of the present disclosure. In one or more embodiments, system 100 includes a sensor 108 attached to a power source 104 of an electric aircraft 120. Sensor 108 is configured to detect a condition datum 132 of an operating component and/or an operating state of power source 104. For the purposes of this disclosure, a "power source" may refer to a device and/or component used to store and provide electrical energy to an aircraft and aircraft subsystems. For example, and without limitation, power source 104 may be a battery and/or a battery pack having one or more battery modules 112a-n or battery cells. In one or more embodiments, power source 104 may be one or more various types of batteries, such as a pouch cell battery, stack batteries, prismatic battery, lithium-ion cells, or the like. In one or more embodiments, power source 104 may include a battery, flywheel, rechargeable battery, flow battery, glass battery, lithium-ion battery, ultrabattery, and the like thereof.

With continued reference to FIG. 1, sensor 108 may be communicatively connected to a computing device 116 and power source 104. Sensor 108 may include one or more sensors. As used in this disclosure, a "sensor" is a device that is configured to detect an input and/or a phenomenon and transmit information related to the detection. For example, and without limitation, a sensor may transduce a detected phenomenon, such as without limitation, temperature, voltage, current, pressure, and the like, into a sensed signal. Sensor 108 may detect a plurality of data about power source 104. A plurality of data about power source 104 may include, but is not limited to, battery quality, battery life cycle, remaining battery capacity, current, voltage, pressure, temperature, moisture level, and the like. In one or more embodiments, and without limitation, sensor may include a plurality of sensors. In one or more embodiments, and without limitation, sensor 108 may include one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, and the like. Sensor 108 may be a contact or a non-contact sensor. For example, and without limitation, sensor 108 may be connected to electric aircraft 120 and/or a component of power source 104. In other embodiments, sensor 108 may be remote to power source 104. Sensor 108 may be communicatively connected to a computing device 116, as discussed further in this disclosure. Computing device 116 may include a processor, pilot control, and/or a controller, such as a flight controller, so that sensor may transmit/receive signals to/from computing device 116, respectively. Signals may include electrical, electromagnetic, visual, audio, radio waves, or another undisclosed signal type alone or in combination.

Sensor 108 may include a plurality of independent sensors, where any number of the described sensors may be used to detect any number of physical or electrical quantities associated with power source 104 or an electrical energy storage system of aircraft 120. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor 108 to detect phenomenon may be maintained.

Still referring to FIG. 1, sensor 108 may include a motion sensor. A "motion sensor", for the purposes of this disclosure, refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 108 may include, torque sensor, gyroscope, accelerometer, torque sensor, magnetometer, inertial measurement unit (IMU), pressure sensor, force sensor, proximity sensor, displacement sensor, vibration sensor, among others. For example, without limitation, sensor 108 may include a gyro sensor configured to detect if power source 104 has been shifted from a desired position within aircraft 120.

In some embodiments, sensor 108 may include a pressure sensor. Pressure, for the purposes of this disclosure, and as would be appreciated by someone of ordinary skill in the art, is a measure of force required to stop a fluid from expanding and is usually stated in terms of force per unit area. The pressure sensor that may be included in sensor 108 may be configured to measure an atmospheric pressure and/or a change of atmospheric pressure. In some embodiments, the pressure sensor may include an absolute pressure sensor, a gauge pressure sensor, a vacuum pressure sensor, a differential pressure sensor, a sealed pressure sensor, and/or other unknown pressure sensors or alone or in a combination thereof. The pressor sensor may include a barometer. In some embodiments, the pressure sensor may be used to indirectly measure fluid flow, speed, water level, and altitude. In some embodiments, the pressure sensor may be configured to transform a pressure into an analogue electrical signal. In some embodiments, the pressure sensor may be configured to transform a pressure into a digital signal.

In one or more embodiments, sensor 108 may include a moisture sensor. "Moisture", as used in this disclosure, is the presence of water, which may include vaporized water in air, condensation on the surfaces of objects, or concentrations of liquid water. Moisture may include humidity. "Humidity", as used in this disclosure, is the property of a gaseous medium (almost always air) to hold water in the form of vapor.

In one or more embodiments, sensor 108 may include electrical sensors. Electrical sensors may be configured to measure voltage across a component, electrical current through a component, and resistance of a component. In one or more embodiments, sensor 108 may include thermocouples, thermistors, thermometers, infrared sensors, resistance temperature sensors (RTDs), semiconductor based integrated circuits (ICs), a combination thereof, or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor 108, may be measured in Fahrenheit (° F.), Celsius (° C.), Kelvin (° K), or another scale alone or in combination. The temperature measured by sensors may comprise electrical signals, such as condition data 132, which are transmitted to their appropriate destination wireless or through a wired connection.

In one or more embodiments, sensor 108 may include a sensor suite which may include a plurality of sensors that may detect similar or unique phenomena. For example, in a non-limiting embodiment, sensor suite may include a plurality of voltmeters or a mixture of voltmeters and thermocouples. System 100 may include a plurality of sensors in the form of individual sensors or a sensor suite working in tandem or individually. A sensor suite may include a plurality of independent sensors, as described in this disclosure, where any number of the described sensors may be used to detect any number of physical or electrical quantities associated with an aircraft. Independent sensors may include separate sensors measuring physical or electrical quantities that may be powered by and/or in communication with circuits independently, where each may signal sensor output to a control circuit such as computing device 116. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained.

In one or more embodiments, sensor 108 may include a sense board, such as sense board. A sense board may have at least a portion of a circuit board that includes one or more sensors configured to, for example, measure a temperature of power source 104. In one or more embodiments, a sense board may be connected to one or more battery modules 112a-n or cells of power source 104. In one or more embodiments, a sense board may include one or more circuits and/or circuit elements, including, for example, a printed circuit board component. A sense board may include, without limitation, a control circuit configured to perform and/or direct any actions performed by the sense board and/or any other component and/or element described in this disclosure. The control circuit may include any analog or digital control circuit, including without limitation a combinational and/or synchronous logic circuit, a processor, microprocessor, microcontroller, or the like.

Still referring to FIG. 1, sensor 108 may include sensors configured to measure physical and/or electrical parameters, such as, and without limitation, temperature and/or voltage, of power source 104. For example, and without limitation, sensor 108 may monitor voltage and/or temperature of battery modules 112a-n and/or cells of power source 104. Sensor 108 may be configured to detect failure within each battery module 112a-n, for instance and without limitation, as a function of and/or using detected physical and/or electrical parameters. In one or more exemplary embodiments, battery cell failure may be characterized by a spike in temperature and sensor 108 may be configured to detect that increase in temperature and generate signals, which are discussed further below, to notify users, support personnel, safety personnel, flight crew, maintainers, operators, emergency personnel, aircraft computers, or a combination thereof. In other exemplary embodiments, sensor 108 may detect voltage and direct the charging of individual battery cells according to charge level. Detection may be performed using any suitable component, set of components, and/or mechanism for direct or indirect measurement and/or detection of voltage levels, including without limitation comparators, analog to digital converters, any form of voltmeter, or the like.

In one or more embodiments, computing device 116 may be configured to adjust charge to one or more battery modules 112a-n as a function of a charge level and/or a detected parameter, such as condition datum 132. For instance, and without limitation, computing device 116 may be configured to determine that a charge level of a battery cell is high based on a detected voltage level of that battery cell. Computing device 116 may alternatively or additionally detect a charge reduction event, defined for purposes of this disclosure as any temporary or permanent state of a battery cell requiring reduction or cessation of charging. A charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a preconfigured threshold, detection of a voltage and/or resistance level above or below a preconfigured threshold, or the like, as discussed further below in this disclosure.

Sense board and/or a control circuit incorporated therein and/or communicatively connected thereto may be configured to adjust charge to at least one battery cell of the plurality of battery modules 112a-n or battery cells as a function of condition datum 132 (this may include adjustment in charge as a function of detection of a charge reduction event). Alternatively or additionally, sense board and/or a control circuit incorporated therein and/or communicatively connected thereto may be configured to increase charge to battery modules 112a-n upon detection that a charge reduction event has ceased. For instance, sense board and/or a control circuit incorporated therein and/or communicatively connected thereto may detect that a temperature of a subject battery cell has dropped below a threshold, and may increase charge again. Charge may be regulated using any suitable means for regulation of voltage and/or current, including without limitation use of a voltage and/or current regulating component, including one that may be electrically controlled such as a transistor; transistors may include without limitation bipolar junction transistors (BJTs), field effect transistors (FETs), metal oxide field semiconductor field effect transistors (MOSFETs), and/or any other suitable transistor or similar semiconductor element. Voltage and/or current to one or more cells may alternatively or additionally be controlled by thermistor in parallel with a cell that reduces its resistance when a temperature of the cell increases, causing voltage across the cell to drop, and/or by a current shunt or other device that dissipates electrical power, for instance through a resistor.

Outputs, such as condition datum 132, from sensor 108 or any other component present within system 100 may be analog or digital. Onboard or remotely located processors can convert those output signals from sensor 108 or sensor suite to a usable form by the destination of those signals, such as computing device 116. The usable form of output signals from sensors, through processor may be either digital, analog, a combination thereof, or an otherwise unstated form. Processing may be configured to trim, offset, or otherwise compensate the outputs of sensor suite. Based on sensor output, the processor can determine the output to send to downstream component. Processor can include signal amplification, operational amplifier (OpAmp), filter, digital/analog conversion, linearization circuit, current-voltage change circuits, resistance change circuits such as Wheatstone Bridge, an error compensator circuit, a combination thereof or otherwise undisclosed components.

Still referring to FIG. 1, as previously mentioned, sensor 108 may be configured to detect condition datum 132 of power source 104. In one or more embodiments, sensor 108 may be configured to generate a sensor output, which includes condition datum 132. For purposes of this disclosure, a "condition datum" is an electronic signal representing at least an element of data correlated to a quantifiable operating state of a power source. For instance, and without limitation, a power source may need to be a certain temperature to operate properly; condition datum 132 may provide a numerical value, such as temperature in degrees, that indicates the current temperature of power source 104. For example, and without limitation, sensor 108 may be a temperature sensor that detects the temperature of power source 104 to be at a numerical value of 70° F. and transmits the corresponding condition datum to, for example, computing device 116. In another example, and without limitation, sensor 108 may be a current sensor and a voltage sensor that detects a current value and a voltage value, respectively, of power source 104. Such condition datum 132 may then be used to determine an operating condition of power source 104 such as, for example, a state of charge (SoC) or a depth of discharge (DoD) of power source 104. In one or more embodiments, an operating state may include, for example, a temperature state, a state of charge, a moisture-level state, a state of health (or depth of discharge), or the like.

Figure 2:
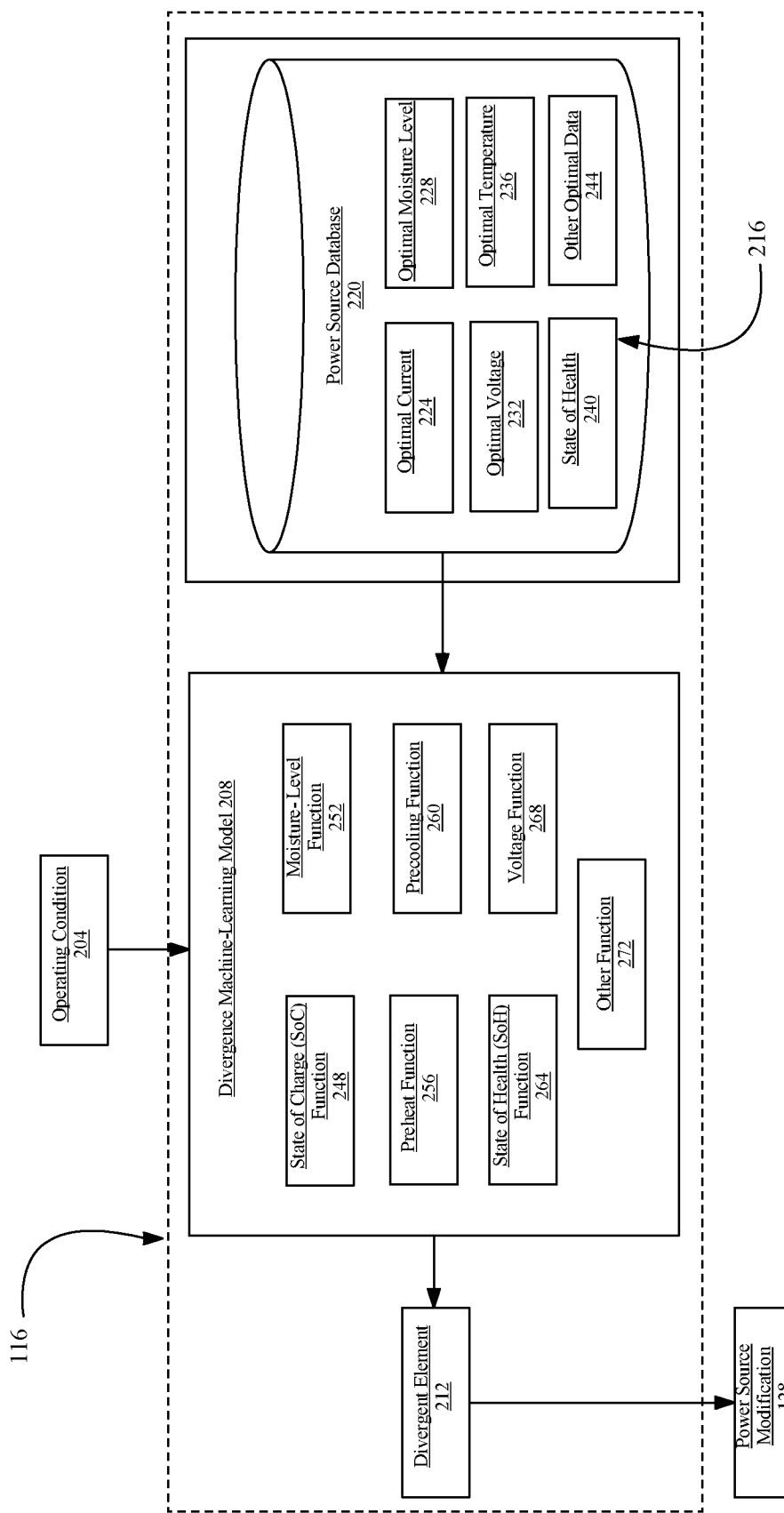
FIG. 2 is a block diagram of an exemplary embodiment of a divergence machine-learning model and a power source database in accordance with aspects of the invention thereof.

Still referring to FIG. 1, computing device 116 may be communicatively connected to sensor 108 and configured to obtain an optimal performance condition of power source 104 of electric aircraft 120. In one or more embodiments, and without limitation, computing device 116 may be a computing device, a flight controller, may be included in a flight controller, or may be a processor. In one or more embodiments, computing device 116 may include a processor that executes instructions provided by for example, a user input, and receives sensor output such as, for example, condition datum 132. For example, flight controller may be configured to obtain an optimal performance condition of power source 104 of electric aircraft 120, where the optimal performance condition is provided by, for example, a user input. For purposes of this disclosure, an "optimal performance condition" is an element of information regarding a maximized and/or a most effective operating state of a power source. In one or more embodiments, an optimal performance condition may include a plurality of optimal performance conditions at various stages of use. In one or more embodiments, various stages of use may include prior to takeoff, during flight, after landing, and the like. For example, and without limitation, an optimal performance condition for an initial SoC of power source 104 may be 100%, or full, where the initial SoC means the SoC of power source 104 prior to takeoff of aircraft 120. In another example, and without limitation, an optimal performance condition for an operating state of an initial temperature of power source 104 may be 75° F., where the initial temperature is the temperature of power source 104 prior to takeoff. In another example, and without limitation, an optimal performance condition for an operating state of a final temperature of power source 104 may be 90° F., where the final temperature is the temperature of power source 104 after landing. In one or more embodiments, an optimal performance condition may include a maximized function of power source 104. For purposes of this disclosure, a "maximized function" is a greatest level of operation and/or condition of an operating state of a power source. For example, and without limitation, an optimal performance condition may include a maximized state of charge of 100%, as previously mentioned. In another example, and without limitation, an optimal performance condition may include a maximized depth of discharge of 0%, suggesting power source 104 is in an ideal state of being brand new. Optimal performance condition may be obtained by computing device 116 in various ways. For example, in non-limiting embodiments, an optimal performance condition may be obtained from a prior use element, where a past optimal condition of a state of power source 104 may be stored in a memory component of computing device 116 for future reference. For the purposes of this disclosure, a "prior use element" is data and/or information obtained from previous experiences related to use of a power source that may be stored in a memory of a computing device. In other non-limiting embodiments, an optimal performance condition is obtained from a user input. For example, and without limitation, a user, such as maintenance personnel, may manually input an optimal performance condition using, for example, a graphic user interface of computing device 116. In other non-limiting embodiments, an optimal performance condition is obtained from a power source database 220, as shown in FIG. 2, as discussed further below in this disclosure.

Still referring to FIG. 1, computing device 116 may identify an operating condition of an operating component or operating state of power source 104 as a function of the condition datum. For purposes of this disclosure, an "operating condition" is an element of information regarding a current and/or present-time quality or working order of an operating state of a power source and/or a component thereof. Operating condition may be determined based on condition datum 132 provided by sensor 108. For example, and without limitation, an operating condition for a SoC of power source 104 may be 75%. In another example, and without limitation, an operating condition for a DoD (also referred to herein as a "State of Health (SOH)") of power source 104 may be 20%, where DoD refers to a lifetime of power source 104 after repeated use. In yet another example, and without limitation, an operating condition for a state of temperature of power source 104 may be 60° F. due to cool ambient temperatures caused by, for example, environmental weather.

Still referring to FIG. 1, computing device 116 may determine a divergent element as a function of an optimal performance condition and an operating condition of power source 104. For the purposes of this disclosure, a "divergent element" is a value and/or quantity at which operating condition deviates from optimal performance condition. In one or more embodiments, divergent element may indicate power source 104 is operating outside of a preconfigured threshold (also referred to herein as a "threshold") of optimal performance condition. For the purposes of this disclosure, a "threshold" is a set desired range and/or value that when operating condition is outside of set desired range and/or value, a specific reaction of computing device 116 is initiated. A specific reaction may be, for example, a power source modification 128, which as discussed further below in this disclosure. In one or more embodiments, divergent element may include a divergence magnitude, which indicates a quantity that operating condition is outside of threshold. Threshold may be set by, for example, a user or flight controller based on, for example, prior use or input. In one or more embodiments, if operating condition of power source 104 is determined to be outside of threshold of optimal performance condition, divergent element and divergence magnitude are determined by computing device 116. For example, and without limitation, in cold weather, power source 108 may need to be preheated prior to takeoff to be fully operational. An optimal performance condition for an operating state of temperature may be 75° F. for power source 104. A threshold related to optimal performance may, thus, be set at 75° F. If an operating condition is determined to be 55° F., the divergent element is 20° F., indicating the amount that operating condition is below threshold. Operating condition being below threshold indicates that power source 104 is a temperature considered too low to operate properly. Similarly, if an operating condition is determined to be 80° F. and the threshold is 75° F., then divergent element is 5° F. since operating condition exceeds threshold by 5° F.

In one or more embodiments, determining divergent element may include one or more thresholds that denote a magnitude and/or level of divergence. For example, and without limitation, a magnitude of divergence may include a "low" divergence, a "medium" divergence, and/or a "high" divergence. In one or more exemplary embodiments, a "low" magnitude of divergence may result in notification of a user via, for example, an indicator or graphic user interface but power source 104 may still be considered in operational condition and, thus, prepared for takeoff. In another example, a user may choose to takeoff despite the determined divergent element or may decide to initiate power source modification 128. For the purposes of this disclosure, a "power source modification" is a signal transmitted to an aircraft system or a power source providing a command to perform a specific modification action to adjust an operating condition of a power source to an optimal condition of the power source and/or adjust the operating condition by the magnitude of divergence. In one or more exemplary embodiments, a "medium" magnitude of divergence may result in notification of a user and a required power source modification. For example, and without limitation, if power source is considered too cold to operate, a power source modification of heating power source 104 must be initiated and completed prior to takeoff. In one or more exemplary embodiments, a "high" magnitude of divergence may result in computing device determining that power source requires maintenance and/or replacement prior to takeoff. For example, and without limitation, a power source may require sufficient power for connecting to and operating aircraft subsystems; thus, if power source 104 has a SoC of 30%, electric aircraft 120 cannot takeoff until power source 104 is replaced or fully charged. As understood by one skilled in the art, a divergent element may be determined for power source 104 and/or for each battery module 112*a-n* of power source 104.

Still referring to FIG. 1, computing device 116 may initiate power source modification 128 as a function of determined divergent element. In one or more embodiments, power source modification 128 may include an adjustment of operating condition of power source 104 to optimal performance condition. For instance, and without limitation, power source modification 128 may include computing device 116 providing a command signal to aircraft system 124 to perform a modification action 136. For the purposes of this disclosure, a "modification action" is an act and/or process performed by an aircraft system or a power source in response to a received power source modification. In one or more non-limiting embodiments, power source modification 128 may include a temperature adjustment, voltage output adjustment, voltage input adjustment, current output adjustment, current input adjustment, any combination thereof, and the like. For example, and without limitation, power source modification 128 may be sent to a ground charging system and include instructions to increase SoC of power source 104 to, for example, 100%. As a result, charging system may produce a modification action, which includes providing electrical energy to power source 108 via, for example, a terminal of power source 108. In one or more non-limiting exemplary embodiments, aircraft system 124 may include an internal or external charging system, a thermal management system, such as a cooling system or a heating system, liquid cooling system, a battery ventilation, where ambient air is drawn about batteries then vented outboard (using an air conditioning duct), a heat pump, a heat sink, a puller fan, a compressor (used to supply bleed-air, which can be utilized in, for example, deicing and anti-icing of power source 104 and pneumatic starting of engines), a condenser, a humidifier, an extract fan, a ground cooling unit, a blower fan, or the like. For example, and without limitation, an aircraft system 124 may include a block heater that may be commanded to perform a modification action including heating power source 108 to an optimal performance condition.

Still referring to FIG. 1, as previously mentioned in this disclosure, system 100 may include a computing device 116. Computing device may include any computing device as described in this disclosure, including without limitation a microcontroller, processor, microprocessor, flight controller, digital signal processor (DSP), and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 100 and/or computing device.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Now referring to FIG. 2, an exemplary embodiment of divergence machine-learning model 208 and power source database 220 of computing device 116 are illustrated. Power source database 220 may include one or more optimal performance conditions of one or more operating states of a power source. For example, and without limitation, power source database may include an optimal current 224, an optimal moisture level 228, an optimal voltage 232, an optimal temperature 236, an optimal SoC, an optimal SoH 240, or other optimal data 244. Power source database 220 may be programmed into computing device 116 or inputted by a user. Power source database 220 may also change based on a prior use element. For example, and without limitation, a previous identification of one or more optimized functions, states, and/or outputs of power source 104 may be considered prior use elements. As understood by one skilled in the art, optimal performance condition 216 may include a plurality of optimal operating conditions that maximize one or more functions, states, and/or outputs of power source 104. For example, optimal performance condition 216 may include a plurality of optimal operating conditions for operating states such as, but not limited to, temperature, voltage, current, and the like, as discussed above in this disclosure.

As understood by one skilled in the art, an operating condition 204 may include one or more operating conditions. For instance, and without limitation, operating condition may include condition data 132 from one or more sensors related to one or more operating states. For example, and without limitation, condition datum 132 may include condition data from a temperature sensor, a voltage sensor, and a current sensor. Condition data may then be used to determine operating conditions of operating states for, for example, temperature and SoC of power source 104. In one or more embodiment, operating condition 204 may be determined using one or more machine-learning models, such as, for example, an operating condition machine-learning model.

In one or more embodiments, determining divergent element 212 may include using one or more machine-learning models, such as exemplary divergence machine-learning model 208. A machine-learning model may include one or more supervised machine-learning models, unsupervised machine-learning models, and the like thereof. For example, and without limitation, flight controller may be configured to train a divergence machine-learning model using training data, where the training data includes a plurality of performance condition elements correlated with operating condition elements. In one or more non-limiting exemplary embodiments, machine-learning model 208 may include various algorithms and/or functions used to relate operating condition 204 and optimal performance condition 216 to determine if there is a divergent element 212 of an operating state of power source 104. For example, and without limitation, divergence machine-learning model 208 may use functions such as a SoC function 248, a moisture-level function 252, a preheat function 256, a precooling function 260, a SoH function 264, a voltage function 268, or other functions 272. If there is a divergent element, then power source modification 128 may be initiated, as discussed above in this disclosure.

In one or more embodiments, and without limitation, divergent element 212 may be determined as a function of optimal performance condition 216 and operating condition 204. For example, and without limitation, computing device 116 may be configured to train divergence machine-learning model 208 using condition training data, which includes a plurality of performance condition elements correlated with operating condition elements 216. Computing device 116 may then be configured to generate divergent element 212 as a function of divergence machine-learning model 208. For example, and without limitation, divergence machine-learning model 208 may relate optimal performance condition 216 with one or more operating conditions to determine a corresponding divergent element and magnitude of divergence.

Still referring to FIG. 2, computing device 116 may be configured to display divergent element 212 and receive a user input for power source modification 128. In one or more embodiments, graphic user interface may notify a user of how much time is required to remedy one or more determined divergent elements 212. For example, and without limitation, a battery status for one or more operating states of power source 108 may be provided on a display of aircraft 120 or via an indicator, such as an LED indicator.

In one or more embodiments, sensor 108 may be instructed by computing device 116 to provide continuous condition datum 132. In other embodiments, sensor 108 may only be instructed to provide condition datum 132 upon request, such as a user request or automated request initiated by powering of avionic systems of aircraft 120. Computing device 116 may request interrogation of specific operating states of power source 108 or may request condition datum 132 related to all operating states of power source 108. In other embodiments, preconditioning of power source 108 may be scheduled, such as using a timer. Preconditioning of power source 108 may occur prior to takeoff or after landing.

Figure 3:
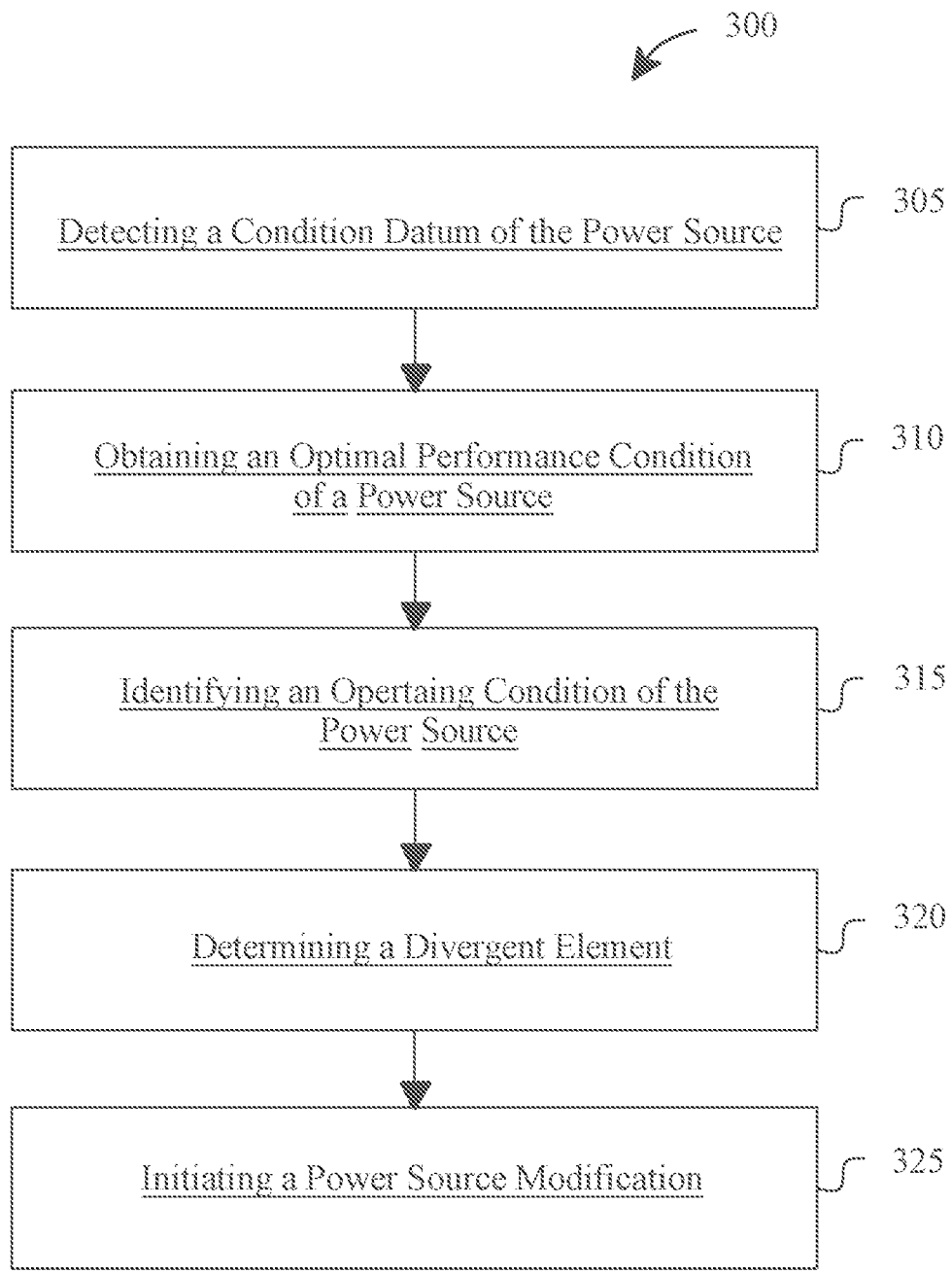
FIG. 3 is a flow diagram illustrating an exemplary method of preconditioning a power source in accordance with aspects of the invention thereof.

Now referring to FIG. 3, flow chart of an exemplary method 300 of preconditioning power source 104 of electric aircraft 120 is shown in accordance with one or more embodiments of the present disclosure. As shown in block 305, method 300 may include detecting, by sensor 108 attached to power source 104 of electric aircraft 120, condition datum 132 of power source 104.

As shown in block 310, method 300 may include obtaining, by flight controller communicatively connected to sensor 108, an optimal performance condition of power source 104 of electric aircraft 120. As previously mentioned, an optimal performance condition may include a maximized function of power source 104.

As shown in block 315, method 300 may include identifying an operating condition of the power source as a function of the condition datum.

As shown in block 320, method 300 may include determining a divergent element as a function of the optimal performance condition and the operating condition of the power source. In one or more embodiments, the divergent element may indicate the power source is operating outside of the optimal performance condition. If a divergent element is determined, method 300 includes initiating a power source modification as a function of the divergent element, as shown in block 325. In one or more embodiments, determining a divergent element may include training a divergence machine-learning model using a training data, where the training data includes optimal performance condition and operating condition; and generating divergent element as a function of divergence machine-learning model, as discussed further below in this disclosure. In one or more embodiments, initiating a power source modification may include commanding aircraft system 124 of electric aircraft 120 to perform a modification action.

In one or more embodiments, method 300 may also include displaying a divergent element on a display of, for example, flight controller; and receiving a user input, by flight controller, for power source modification 128.

Figure 4:
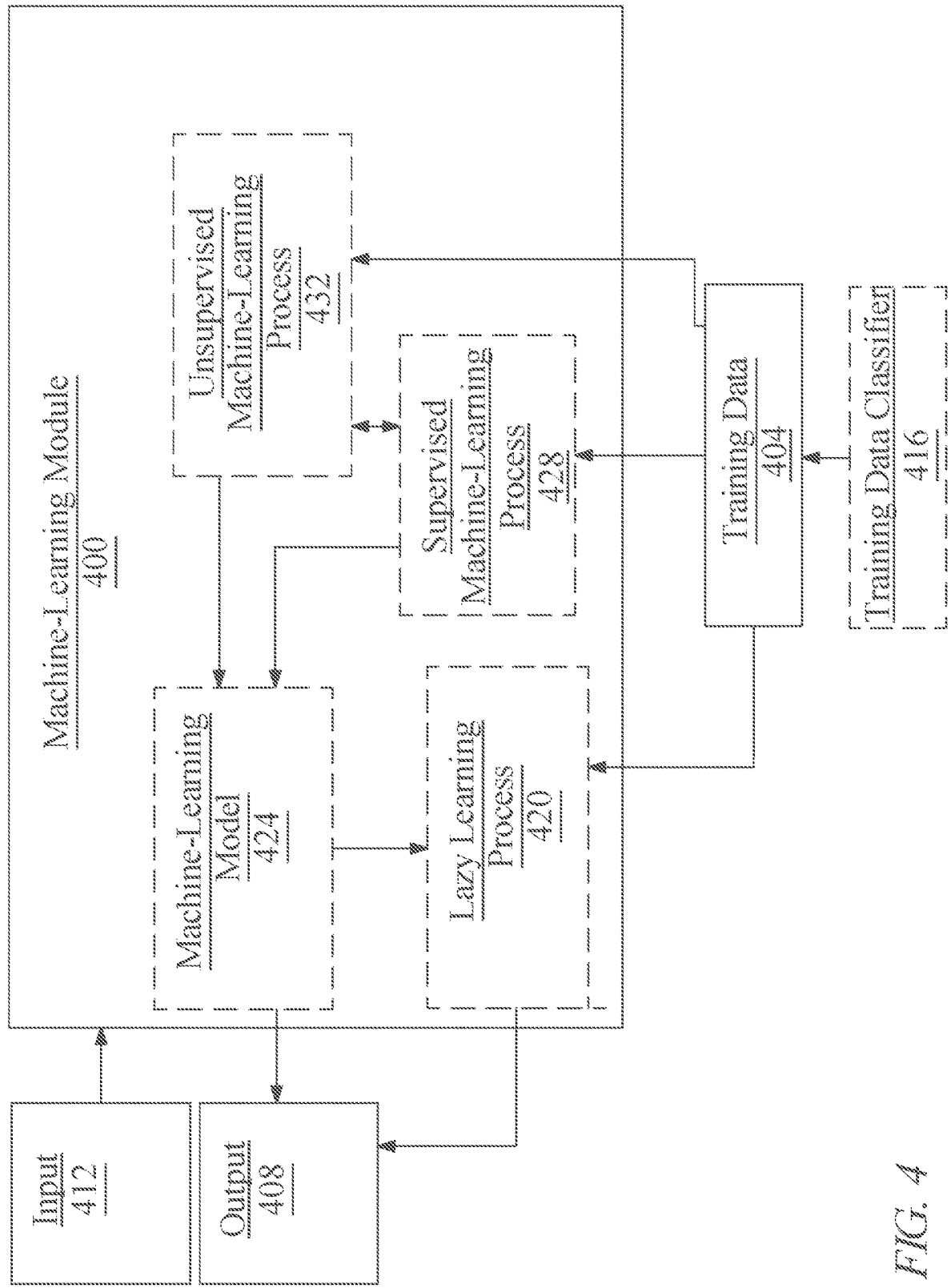
FIG. 4 is a block diagram illustrating an exemplary machine-learning module that can be used to implement any one or more of the methodologies disclosed in this disclosure and any one or more portions thereof in accordance with aspects of the invention thereof.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine-learning processes. A "machine-learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together. For example, and without limitation, training data 404 may include condition datum 132 detected and provided by sensor 108 to computing device 116. In another example, and without limitation, training data 404 may include operating condition 204. In one or more embodiments, data elements may be correlated by shared existence in a given data entry, by proximity in a given data entry, or the like. Multiple data entries in training data 404 may evince one or more trends in correlations between categories of data elements. For instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations. Correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example, condition datum 132, operating condition 204, and/or user signals may be inputs, and an output may be, for example, power source modification 128.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof. In another example, and without limitation, training data classifier 416 may classify elements of training data to sub-categories of operating states such as SoC, DoD, temperature, moisture level, and the like thereof.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naive Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

In one or more embodiments, and without limitation, a divergent element may be determined as a function of optimal performance condition and operating condition. For example, and without limitation, computing device 116 may be configured to train a divergence machine-learning model using condition training data, where the condition training data includes a plurality of optimal performance condition elements correlated with operating condition elements. Computing device 116 may then be configured to generate divergent element as a function of the divergence machine-learning model. For example, and without limitation, divergence machine-learning model may relate optimal performance condition with one or more operating conditions to determine a corresponding divergent element and magnitude of divergence.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include operating states, flight elements, and/or pilot signals as described above as inputs, autonomous functions as outputs, and a scoring function representing a desired form of relationship to be detected between inputs and outputs. Scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine-learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
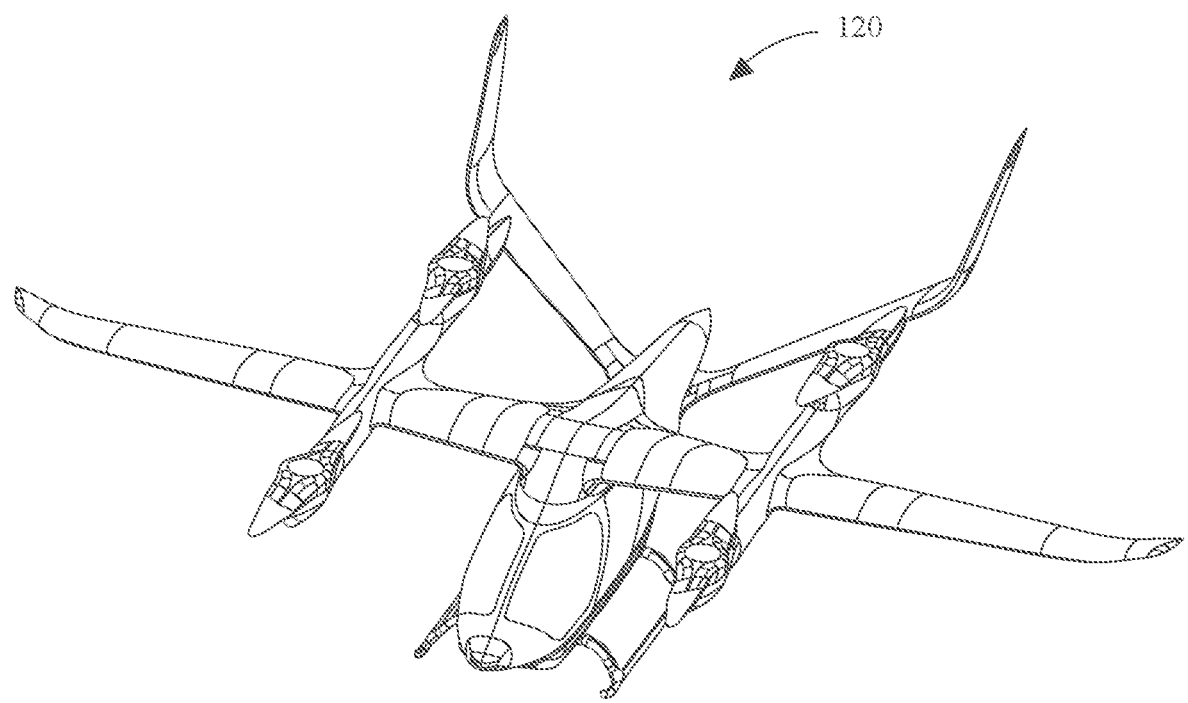
FIG. 5 is a diagrammatic representation illustrating an isometric view of an electric aircraft in accordance with aspects of the invention thereof.

Now referring to FIG. 5, an exemplary embodiment of aircraft 120 is illustrated in accordance with one or more embodiments of the present disclosure. An "aircraft", as described herein, is a vehicle that travels through the air. As a non-limiting example, aircraft may include airplanes, helicopters, airships, blimps, gliders, paramotors, drones, and the like. Additionally or alternatively, an aircraft may include one or more electric aircrafts and/or hybrid electric aircrafts. For example, and without limitation, aircraft 120 may include an electric vertical takeoff and landing (eVTOL) aircraft, as shown in FIG. 5. As used herein, a vertical takeoff and landing (eVTOL) aircraft is an electrically powered aircraft that can take off and land vertically. An eVTOL aircraft may be capable of hovering. In order, without limitation, to optimize power and energy necessary to propel an eVTOL or to increase maneuverability, the eVTOL may be capable of rotor-based cruising flight, rotor-based takeoff, rotor-based landing, fixed-wing cruising flight, airplane-style takeoff, airplane-style landing, and/or any combination thereof. Rotor-based flight is where the aircraft generates lift and propulsion by way of one or more powered rotors coupled with an engine, such as a "quad copter," helicopter, or other vehicle that maintains its lift primarily using downward thrusting propulsors. Fixed-wing flight, as described herein, flight using wings and/or foils that generate life caused by an aircraft's forward airspeed and the shape of the wings and/or foils, such as in airplane-style flight.

Figure 6:
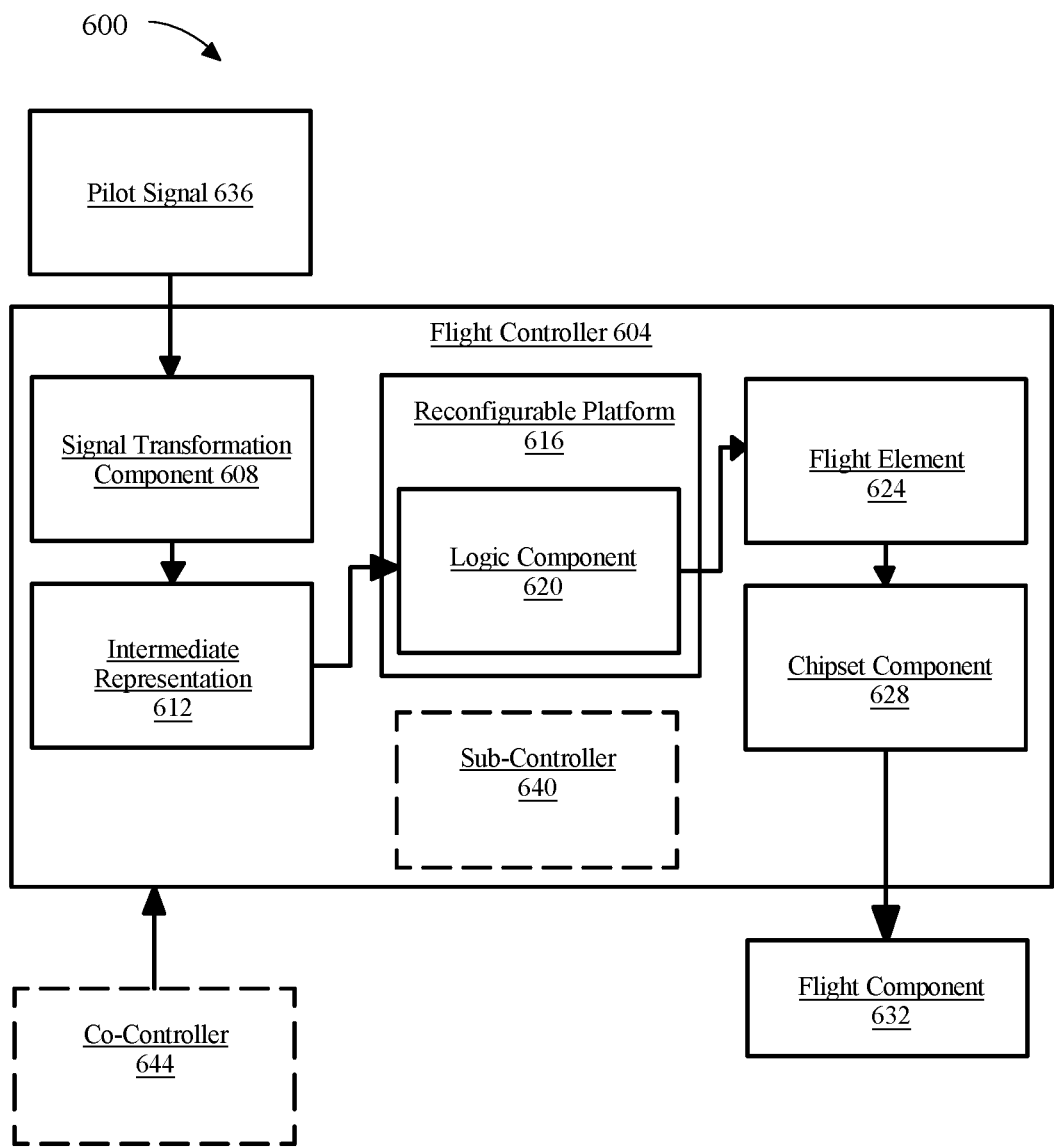
FIG. 6 is a block diagram of a flight controller in accordance with aspects of the invention thereof.

Now referring to FIG. 6, an exemplary embodiment 600 of a flight controller 604 is illustrated. As used in this disclosure a "flight controller" is a computing device or a plurality of computing devices dedicated to data storage, security, distribution of traffic for load balancing, and flight instruction. Flight controller 604 may include and/or communicate with any computing device as described in this disclosure, including without limitation a microcontroller, microprocessor, digital signal processor (DSP) and/or system on a chip (SoC) as described in this disclosure. Further, flight controller 604 may include a single computing device operating independently, or may include two or more computing device operating in concert, in parallel, sequentially or the like; two or more computing devices may be included together in a single computing device or in two or more computing devices. In embodiments, flight controller 604 may be installed in an aircraft, may control the aircraft remotely, and/or may include an element installed in the aircraft and a remote element in communication therewith.

In an embodiment, and still referring to FIG. 6, flight controller 604 may include a signal transformation component 608. As used in this disclosure a "signal transformation component" is a component that transforms and/or converts a first signal to a second signal, wherein a signal may include one or more digital and/or analog signals. For example, and without limitation, signal transformation component 608 may be configured to perform one or more operations such as preprocessing, lexical analysis, parsing, semantic analysis, and the like thereof. In an embodiment, and without limitation, signal transformation component 608 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 608 may include transforming one or more low-level languages such as, but not limited to, machine languages and/or assembly languages. For example, and without limitation, signal transformation component 608 may include transforming a binary language signal to an assembly language signal. In an embodiment, and without limitation, signal transformation component 608 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 6, signal transformation component 608 may be configured to optimize an intermediate representation 612. As used in this disclosure an "intermediate representation" is a data structure and/or code that represents the input signal. Signal transformation component 608 may optimize intermediate representation as a function of a data-flow analysis, dependence analysis, alias analysis, pointer analysis, escape analysis, and the like thereof. In an embodiment, and without limitation, signal transformation component 608 may optimize intermediate representation 612 as a function of one or more inline expansions, dead code eliminations, constant propagation, loop transformations, and/or automatic parallelization functions. In another embodiment, signal transformation component 608 may optimize intermediate representation as a function of a machine dependent optimization such as a peephole optimization, wherein a peephole optimization may rewrite short sequences of code into more efficient sequences of code. Signal transformation component 608 may optimize intermediate representation to generate an output language, wherein an "output language," as used herein, is the native machine language of flight controller 604. For example, and without limitation, native machine language may include one or more binary and/or numerical languages.

In an embodiment, and without limitation, signal transformation component 608 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 6, flight controller 604 may include a reconfigurable hardware platform 616. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 616 may be reconfigured to enact any algorithm and/or algorithm selection process received from another computing device and/or created using machine-learning processes.

Still referring to FIG. 6, reconfigurable hardware platform 616 may include a logic component 620. As used in this disclosure a "logic component" is a component that executes instructions on output language. For example, and without limitation, logic component may perform basic arithmetic, logic, controlling, input/output operations, and the like thereof. Logic component 620 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 620 may be organized according to Von Neumann and/or Harvard architecture as a non-limiting example. Logic component 620 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 620 may include one or more integrated circuit microprocessors, which may contain one or more central processing units, central processors, and/or main processors, on a single metal-oxide-semiconductor chip. Logic component 620 may be configured to execute a sequence of stored instructions to be performed on the output language and/or intermediate representation 612. Logic component 620 may be configured to fetch and/or retrieve the instruction from a memory cache, wherein a "memory cache," as used in this disclosure, is a stored instruction set on flight controller 604. Logic component 620 may be configured to decode the instruction retrieved from the memory cache to opcodes and/or operands. Logic component 620 may be configured to execute the instruction on intermediate representation 612 and/or output language. For example, and without limitation, logic component 620 may be configured to execute an addition operation on intermediate representation 612 and/or output language.

In an embodiment, and without limitation, logic component 620 may be configured to calculate a flight element 624. As used in this disclosure a "flight element" is an element of datum denoting a relative status of aircraft. For example, and without limitation, flight element 624 may denote one or more torques, thrusts, airspeed velocities, forces, altitudes, groundspeed velocities, directions during flight, directions facing, forces, orientations, and the like thereof. For example, and without limitation, flight element 624 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 624 may denote that aircraft is following a flight path accurately and/or sufficiently.

Still referring to FIG. 6, flight controller 604 may include a chipset component 628. As used in this disclosure a "chipset component" is a component that manages data flow. In an embodiment, and without limitation, chipset component 628 may include a northbridge data flow path, wherein the northbridge dataflow path may manage data flow from logic component 620 to a high-speed device and/or component, such as a RAM, graphics controller, and the like thereof. In another embodiment, and without limitation, chipset component 628 may include a southbridge data flow path, wherein the southbridge dataflow path may manage data flow from logic component 620 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 628 may manage data flow between logic component 620, memory cache, and a flight component 632. As used in this disclosure a "flight component" is a portion of an aircraft that can be moved or adjusted to affect one or more flight elements. For example, flight component 632 may include a component used to affect the aircrafts' roll and pitch which may comprise one or more ailerons. As a further example, flight component 632 may include a rudder to control yaw of an aircraft. In an embodiment, chipset component 628 may be configured to communicate with a plurality of flight components as a function of flight element 624. For example, and without limitation, chipset component 628 may transmit to an aircraft rotor to reduce torque of a first lift propulsor and increase the forward thrust produced by a pusher component to perform a flight maneuver.

In an embodiment, and still referring to FIG. 6, flight controller 604 may be configured generate an autonomous function. As used in this disclosure an "autonomous function" is a mode and/or function of flight controller 604 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 624. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 604 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 604 will control the ailerons and/or rudders. As used in this disclosure "non-autonomous mode" is a mode that denotes a pilot will control aircraft and/or maneuvers of aircraft in its entirety.

In an embodiment, and still referring to FIG. 6, flight controller 604 may generate autonomous function as a function of an autonomous machine-learning model. As used in this disclosure an "autonomous machine-learning model" is a machine-learning model to produce an autonomous function output given flight element 624 and a pilot signal 636 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 636 may denote that a pilot is controlling and/or maneuvering ailerons, wherein the pilot is not in control of the rudders and/or propulsors. In an embodiment, pilot signal 636 may include an implicit signal and/or an explicit signal. For example, and without limitation, pilot signal 636 may include an explicit signal, wherein the pilot explicitly states there is a lack of control and/or desire for autonomous function. As a further non-limiting example, pilot signal 636 may include an explicit signal directing flight controller 604 to control and/or maintain a portion of aircraft, a portion of the flight plan, the entire aircraft, and/or the entire flight plan. As a further non-limiting example, pilot signal 636 may include an implicit signal, wherein flight controller 604 detects a lack of control such as by a malfunction, torque alteration, flight path deviation, and the like thereof. In an embodiment, and without limitation, pilot signal 636 may include one or more explicit signals to reduce torque, and/or one or more implicit signals that torque may be reduced due to reduction of airspeed velocity. In an embodiment, and without limitation, pilot signal 636 may include one or more local and/or global signals. For example, and without limitation, pilot signal 636 may include a local signal that is transmitted by a pilot and/or crew member. As a further non-limiting example, pilot signal 636 may include a global signal that is transmitted by air traffic control and/or one or more remote users that are in communication with the pilot of aircraft. In an embodiment, pilot signal 636 may be received as a function of a tri-state bus and/or multiplexor that denotes an explicit pilot signal should be transmitted prior to any implicit or global pilot signal.

Still referring to FIG. 6, autonomous machine-learning model may include one or more autonomous machine-learning processes such as supervised, unsupervised, or reinforcement machine-learning processes that flight controller 604 and/or a remote device may or may not use in the generation of autonomous function. As used in this disclosure "remote device" is an external device to flight controller 604. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 6, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 604 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 6, flight controller 604 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 604. Remote device and/or FPGA may transmit a signal, bit, datum, or parameter to flight controller 604 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example, a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 604 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 6, flight controller 604 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 6, flight controller 604 may include, but is not limited to, for example, a cluster of flight controllers in a first location and a second flight controller or cluster of flight controllers in a second location. Flight controller 604 may include one or more flight controllers dedicated to data storage, security, distribution of traffic for load balancing, and the like. Flight controller 604 may be configured to distribute one or more computing tasks as described below across a plurality of flight controllers, which may operate in parallel, in series, redundantly, or in any other manner used for distribution of tasks or memory between computing devices. For example, and without limitation, flight controller 604 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 6, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 632. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 6, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 604. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 612 and/or output language from logic component 620, wherein output language may include one or more analog-to-digital conversions, low bit rate transmissions, message encryptions, digital signals, binary signals, logic signals, analog signals, and the like thereof described above in detail.

Still referring to FIG. 6, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 6, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 6, flight controller 604 may also be implemented using a "shared nothing" architecture in which data is cached at the worker, in an embodiment, this may enable scalability of aircraft and/or computing device. Flight controller 604 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 6, flight controller may include a sub-controller 640. As used in this disclosure a "sub-controller" is a controller and/or component that is part of a distributed controller as described above; for instance, flight controller 604 may be and/or include a distributed flight controller made up of one or more sub-controllers. For example, and without limitation, sub-controller 640 may include any controllers and/or components thereof that are similar to distributed flight controller and/or flight controller as described above. Sub-controller 640 may include any component of any flight controller as described above. Sub-controller 640 may be implemented in any manner suitable for implementation of a flight controller as described above. As a further non-limiting example, sub-controller 640 may include one or more processors, logic components and/or computing devices capable of receiving, processing, and/or transmitting data across the distributed flight controller as described above. As a further non-limiting example, sub-controller 640 may include a controller that receives a signal from a first flight controller and/or first distributed flight controller component and transmits the signal to a plurality of additional sub-controllers and/or flight components.

Still referring to FIG. 6, flight controller may include a co-controller 644. As used in this disclosure a "co-controller" is a controller and/or component that joins flight controller 604 as components and/or nodes of a distributer flight controller as described above. For example, and without limitation, co-controller 644 may include one or more controllers and/or components that are similar to flight controller 604. As a further non-limiting example, co-controller 644 may include any controller and/or component that joins flight controller 604 to distributer flight controller. As a further non-limiting example, co-controller 644 may include one or more processors, logic components and/or computing devices capable of receiving, processing, and/or transmitting data to and/or from flight controller 604 to distributed flight control system. Co-controller 644 may include any component of any flight controller as described above. Co-controller 644 may be implemented in any manner suitable for implementation of a flight controller as described above.

In an embodiment, and with continued reference to FIG. 6, flight controller 604 may be designed and/or configured to perform any method, method step, or sequence of method steps in any embodiment described in this disclosure, in any order and with any degree of repetition. For instance, flight controller 604 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
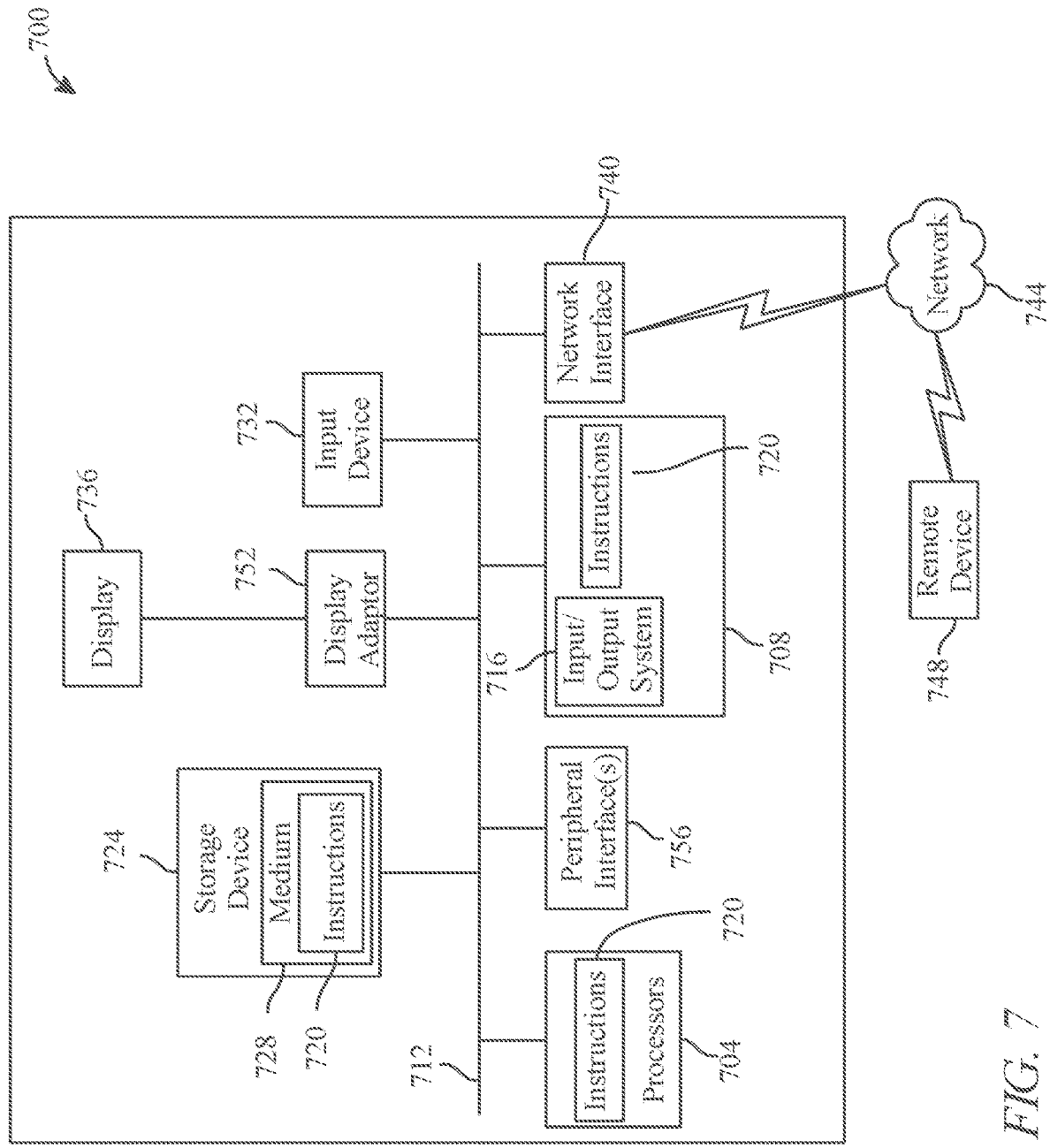
FIG. 7 is a block diagram of a computing device in accordance with aspects of the invention thereof. The drawings are not necessarily to scale and may be illustrated by phantom lines, diagrammatic representations and fragmentary views. In certain instances, details that are not necessary for an understanding of the embodiments or that render other details difficult to perceive may have been omitted.

FIG. 7 shows a diagrammatic representation of one embodiment of computing device 116 in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for preconditioning a power source in an electric aircraft, the system comprising:
    a sensor attached to a power source of an electric aircraft, wherein the sensor is configured to detect a condition datum of an operating component of the power source; and
    a computing device communicatively connected to the sensor; the computing device configured to:
        obtain an optimal performance condition of the power source;
        identify an operating condition of the operating component of the power source as a function of the condition datum;
        determine a divergent element as a function of the optimal performance condition and the operating condition of the power source wherein determining the divergent element comprises:
            training a divergence machine-learning model using condition training data, wherein the condition training data comprising a plurality of optimal performance condition elements correlated with operating condition elements; and
            generating the divergent element as a function of the divergence machine-learning model;
        initiate a power source modification as a function of the divergent element.

2. The system of claim 1, wherein the optimal performance condition comprises a maximized function of the power source.

3. The system of claim 1, wherein the optimal performance condition is obtained from a prior use element.

4. The system of claim 1, wherein the optimal performance condition is obtained from a power source database.

5. The system of claim 1, wherein the optimal performance condition is obtained from a user input.

6. The system of claim 1, wherein the sensor comprises a plurality of sensors.

7. The system of claim 1, wherein the divergent element comprises a divergence magnitude that indicates a quantity that the operating condition is outside of a preconfigured threshold.

8. The system of claim 1, wherein a power source modification comprises an adjustment of an operating condition of the power source.

9. The system of claim 1, wherein the power source modification comprises commanding an aircraft system of the electric aircraft to perform a modification action.

10. The system of claim 1, wherein the computing device is further configured to:
    display the divergent element; and
    receive a user input for the power source modification.

11. The system of claim 1, wherein the electric aircraft comprises an electric vertical takeoff and landing (eVTOL) aircraft.

12. The system of claim 1, wherein the power source comprises a battery.

13. A method for preconditioning a power source in an electric aircraft, the method comprising:
    detecting, by a sensor attached to a power source of an electric aircraft, a condition datum of the power source;
    obtaining, by a computing device communicatively connected to the sensor, an optimal performance condition of the power source;
    identifying by the computing device, an operating condition of the power source as a function of the condition datum;
    determining by the computing device, a divergent element as a function of the optimal performance condition and the operating condition of the power source wherein determining the divergent element comprises:
        training a divergence machine-learning model using condition training data, wherein the condition training data comprising a plurality of optimal performance condition elements correlated with operating condition elements; and
        generating the divergent element as a function of the divergence machine-learning model;
    initiating by the computing device, a power source modification as a function of the divergent element.

14. The method of claim 13, wherein the optimal performance condition comprises a maximized function of the power source.

15. The method of claim 13, further comprising:
    displaying the divergent element on a display of the computing device; and
    receiving a user input, by the computing device, for the power source modification.

16. The method of claim 13, wherein initiating the power source modification comprises commanding one or more flight components of the aircraft to perform a modification action.

17. The method of claim 13, wherein the power source comprises a battery.

18. The method of claim 13, wherein the electric aircraft comprises an electric vertical takeoff and landing (eVTOL) aircraft.

* * * * *